USOO5611518A

United States Patent [19]
Menard

[11] Patent Number: 5,611,518
[45] Date of Patent: Mar. 18, 1997

[54] CONTROL DEVICE FOR A HYDRAULIC SLIDE VALVE

[75] Inventor: Christian Menard, Villennes S/Seine, France

[73] Assignee: Thomson-CSF, Paris, France

[21] Appl. No.: 490,711

[22] Filed: Jun. 15, 1995

[30] Foreign Application Priority Data

Jun. 21, 1994 [FR] France ................................ 94 07571

[51] Int. Cl.⁶ .................................................. F16K 31/04
[52] U.S. Cl. ............................... 251/129.04; 251/129.12; 91/433
[58] Field of Search ...................... 251/129.04, 129.12, 251/129.13; 91/433

[56] References Cited

U.S. PATENT DOCUMENTS

| 4,142,489 | 3/1979 | Menard . |
| 4,250,846 | 2/1981 | Menard . |
| 4,313,414 | 2/1982 | Planteline . |
| 4,352,345 | 10/1982 | Menard et al. . |
| 4,439,716 | 3/1984 | Minnich . |
| 4,451,769 | 5/1984 | Minnich . |
| 4,526,342 | 7/1985 | Wakefield . |
| 4,748,957 | 6/1988 | Menard et al. . |
| 4,845,416 | 7/1989 | Scholl et al. ................. 251/129.13 |
| 5,012,722 | 5/1991 | McCormick . |
| 5,302,009 | 4/1994 | Menard . |
| 5,438,909 | 8/1995 | Menard ........................... 91/361 |

FOREIGN PATENT DOCUMENTS

| 0131656 | 1/1985 | European Pat. Off. . |
| 0589629A1 | 3/1994 | European Pat. Off. . |
| 2454549 | 11/1980 | France . |
| 2746832 | 4/1978 | Germany . |
| 2538491 | 6/1984 | Germany . |
| 4326452A1 | 2/1994 | Germany . |
| WO90/07063 | 6/1990 | WIPO . |

*Primary Examiner*—James Larson
*Attorney, Agent, or Firm*—Oblon, Spivak, McClelland, Maier & Neustadt, P.C.

[57] ABSTRACT

A device for the control of a hydraulic slide valve. The hydraulic valve being put into motion by a motor and by a draw-back spring, the device including structure for controlling the rotational direction of the motor as a function of its positional error, the control structure being, in turn, controlled by a signal given by a correction circuit, the transfer function (K(s)) of which corrects a jet effect that is exerted on the slide valve. The device has application to hydraulic systems requiring large passbands.

9 Claims, 7 Drawing Sheets

CONTROL DEVICE FOR A HYDRAULIC SLIDE VALVE

BACKGROUND OF THE DESCRIPTION

The present invention relates to a control device for a hydraulic slide valve. It can be applied notably to the positional servo-control of hydraulic slide valves with one or more stages for the transmission of mechanical control power whose application requires very short response times and very high stability as is the case in certain braking systems for example.

There are many approaches to the transmission of mechanical control energy. These include systems based on pneumatic, electrical or hydraulic devices. The pneumatic devices have very long response times for many applications and the electrical devices require large quantities of electrical energy that are incompatible with the constraints of on-board systems. These two types of devices are furthermore relatively costly. The control systems of modern vehicles, notably those applied to braking or to automatic guidance for example, require increasingly short response times corresponding, for example, to passbands of over 10 Hz. Furthermore, the reduction of the total cost of the vehicles or of the equipment requires an ever increasing reduction in the cost of their constituent elements, hence also in the cost of the above-mentioned control elements. At present, it is only hydraulic devices that are likely to be best suited to the transmission of mechanical control power on board vehicles or mobile equipment at low cost and with sufficient speed as required by new technical and economic conditions.

The devices generally used in the field of hydraulic controls implement complete devices such as servo-mechanisms based on delivery valves or pressure valves for example. The hydraulic devices have characteristics and types of architecture that constitute a homogeneous whole. Their flow-rate control function or pressure control function is constituted by a set of several stages consisting of slide valves and springs.

As a rule, these servo-mechanisms have two stages. The first stage is a linear actuator. It controls an arm provided with a shaft or bar that is in motion by magnetization. This magnetization results from the action of a current flowing through a solenoid valve associated with the shaft. The second stage is a hydraulic amplifier consisting of a slide valve and a draw-back spring for example. The mechanical inertia values, the resonance values and the time constants complicate the servo-control and restrict the speed of movement of the devices. It is nevertheless possible to improve the performance characteristics of these systems, notably those pertaining to their response time or passband. However, this is obtained at the cost of an increase in their complexity that considerably raises their costs of manufacture. These raised costs may possibly be compatible with aeronautical applications but are incompatible with applications to earth-based vehicles, for example mass-produced vehicles with the requirement of low cost.

There is a known approach that is capable of reducing the above-mentioned drawbacks, notably in simplifying the servo-control by making the phenomena of resonance and instability less dominant. This approach consists in replacing the above actuator, which is of the linear type, by a rotary actuator transmitting a translational motion to the hydraulic slide valve, for example by means of a link-rod, and replacing the springs in the second stage by a drawback spring acting on the rotary actuator. While the latter approach, which is less complicated and more economical, clearly improves the performance characteristics notably by eliminating the resonance phenomena, it has hitherto never been possible, in the tests performed, to attain the desired response times, which are of the order of 0.1 second for example, corresponding to passbands of the order of about 10 Hz.

One drawback of these hydraulic systems, whether they are linear or rotary, is that they may show instability.

A known approach to eliminate this instability, namely the oscillations of the hydraulic slide valve, consists in adding a spring with a high draw-back force to this slide valve. This approach however is not suited to systems that require short response times, in particular because of the draw-back force of the spring.

The aim of the invention is to overcome the above-mentioned drawbacks, notably by enabling the making of hydraulic transmission systems capable of complying with instructions as regards position with short response times while at the same time remaining stable.

SUMMARY OF THE INVENTION

To this end, an object of the invention is a device for the control of a hydraulic slide valve, the hydraulic slide valve being put into motion by a motor and a draw-back spring, wherein said valve comprises means to control the direction of rotation of the motor as a function of the positional error of this motor, the means to control the direction of rotation being controlled by a binary signal given by a correction circuit whose transfer function corrects a jet effect acting on the slide valve.

The main advantages of the invention are that it is compatible, for example, with automatic braking or automatic guidance systems, and that it is economical and simple to implement.

BRIEF DESCRIPTION OF THE DRAWINGS

Other features and advantages of the invention shall appear from the following description, made with reference to the appended drawings, of which.

MORE DETAILED DESCRIPTION

Figure 1:
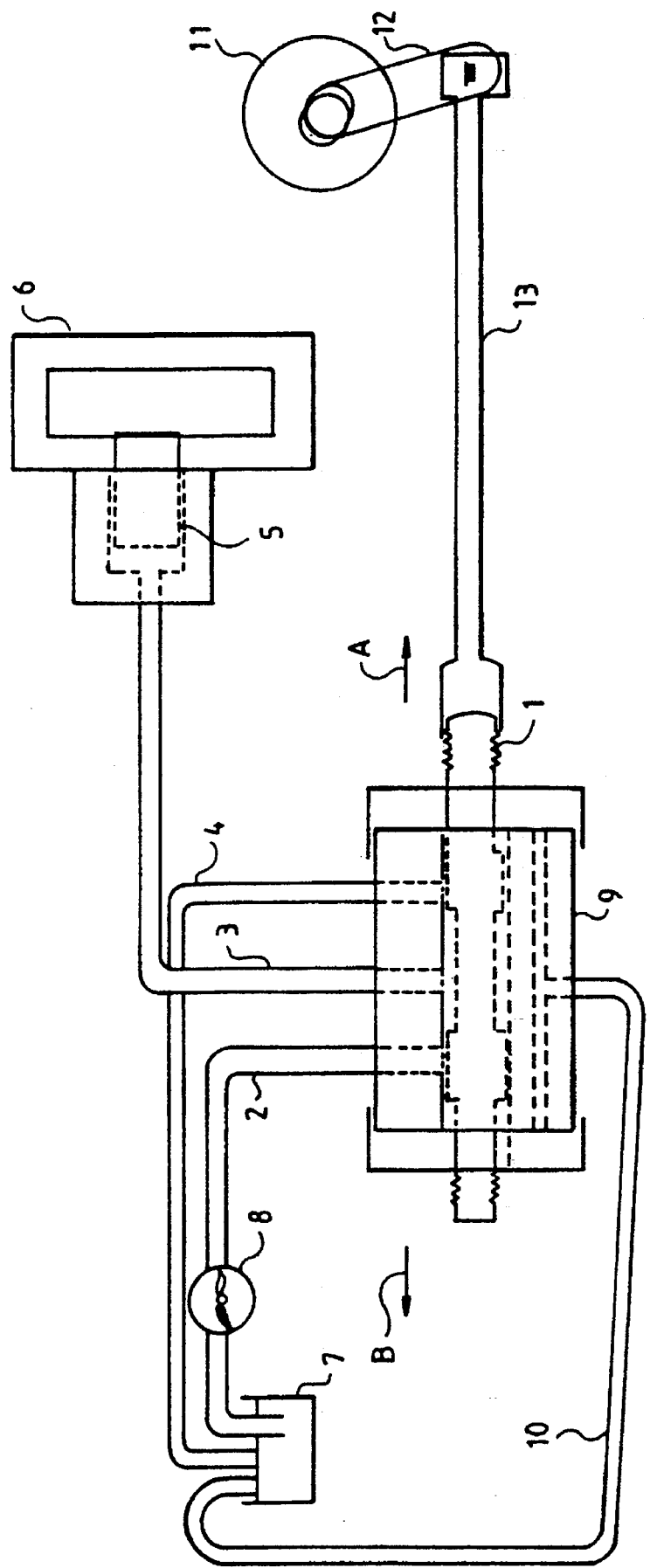
FIG. 1 shows a hydraulic slide valve moved by a rotary actuator.

FIG. 1 exemplifies a rotary actuator 11 fitted out with a draw-back spring (not shown) and transmitting a translational motion to a hydraulic slide valve 1, contained in a body 9, by means of a link-rod 12 and a bar 13. This slide valve routes the flow of oil or braking liquid through several hydraulic circuits 2, 3, 4. The hydraulic slide valve 1, in shifting in the direction indicated by the arrow B, enables the hydraulic flow that is present in a first circuit 2 to be routed towards a second circuit 3, thus placing the hydraulic generation in a state of communication with the load, namely with a piston 5 acting on the jaw or caliper of a brake 6 for example. When the slide valve shifts in the direction indicated by the arrow A, the operation circuit 3 is made to communicate with a third circuit 4. This circuit 4 places the load, namely the piston 5, in a state of communication with a tank 7. The first circuit 2 is connected to the tank 7 by means of a pump 8 regulated at a certain pressure, 150 bars for example. At each of its ends, the body 9 has a bellows device for the recovery of oil or liquid that is then transmitted by a circuit 10 to the tank 7.

The electromagnet of the rotary actuator 11 may be controlled by a pulse current with a frequency of 500 Hz to 20 kHz for example. Means to eliminate its magnetizing capacity, as explained in the French patent application No. 92 02843, may for example be added to the electromagnet in order to improve the passband of the system.

The device of FIG. 1 provides the possibility of bringing about a change, between the link rod 12 and the hydraulic slide valve 1, of the composition of the motion and of the shifting as desired, depending on whether or not cams are interposed between the link rod 12 and the hydraulic slide valve 1. The link rod 12 may furthermore be extended beyond the axis of translation of the hydraulic slide valve 1 represented by the bar 13. This indeed makes it possible to act directly and manually on the position of the slide valve independently of the positional servo-control or of possible dysfunction in this servo-control. This servo-control is achieved, for example, by an electronic module not shown in FIG. 1.

Figure 2:
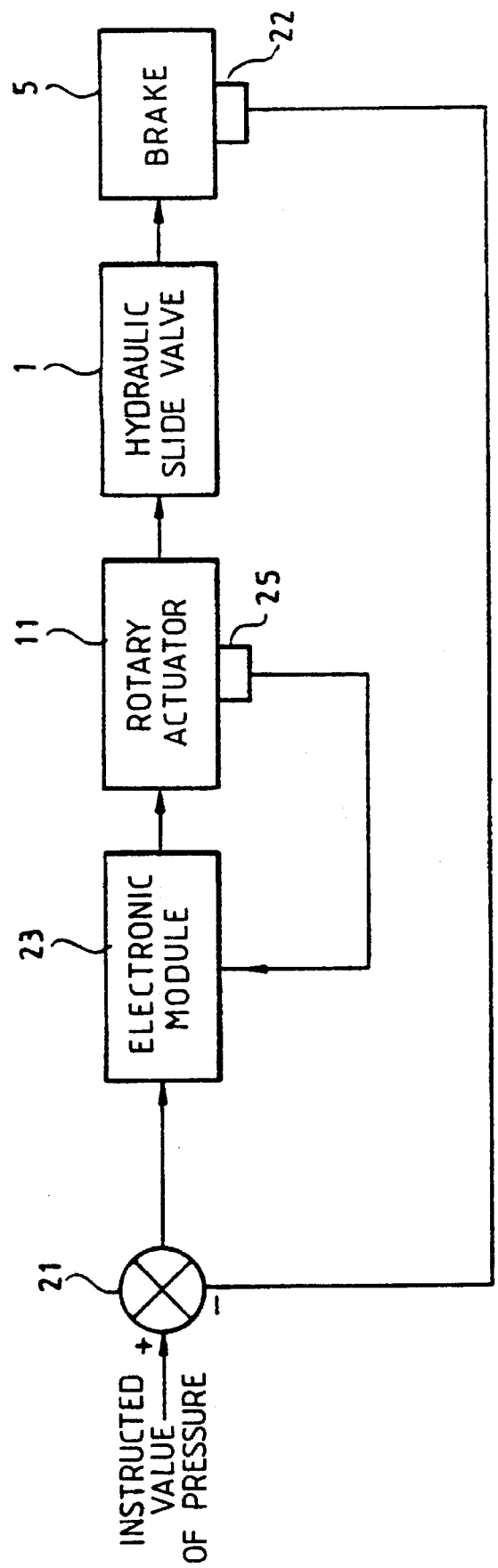
FIG. 2 shows an example of a servo-control system adapted to the above-mentioned system.

FIG. 2 is a block diagram of a possible type of servo-control adapted to the above-described device of FIG. 1.

An instructed value of pressure is displayed at the positive input of a differentiator element 21. This element 21 transmits an information element on error for example to an electronic module 23. An operator internal to this module converts this pressure error into a positional error. The electronic module gives a current I to the electromagnet of the rotary actuator 11 as a function of the desired angular position of this rotary actuator 11. The angular position sensor 25 of the rotary actuator sends the electronic module 23 a voltage or a current representing the position of the actuator. The electronic module 23 makes a comparison with an instructed value as a function of an error information element given by the differentiator element 21 and determines an error signal that may be zero when the position required and the position indicated by the position sensor 25 are identical. The angular position of the rotary actuator 11 corresponds to a linear position of the hydraulic slide valve 1. In the case of use with a braking system for example, depending on the position of the hydraulic valve 1, the pressure is applied to the load, hence to the piston of the brake 5 or sent to the tank 7. Should the pressure be sent to the brake, it increases in the brake. A pressure senor 22 connected to the negative input of the differentiating element 21 indicates the real pressure obtained in the brake. When the instructed value of pressure and the real pressure in the brake are equal, the rotary actuator 11 gets positioned in such a way that the hydraulic slide valve 1 is placed in a position that does not allow the supply pressure to get transmitted to the brake and, consequently, the pressure remains constant.

The servo-control shown in FIG. 2 actually has two servo-control loops: a first loop for the servo-control of the pressure in the brake or, in what amounts to the same thing, of the position of the slide valve and a second loop for the servo-control of the position of the motor. This second loop may actually be likened to a loop for the prepositioning of the slide valve: this prepositioning function can improve the response time of the system. However, instability expressed by oscillations of the slide valve may occur. The draw-back force of the spring connected to the hydraulic slide valve is then increased to dampen the oscillations and thereby reduce or absorb this instability. This means, in particular, that the benefit of using the prepositioning loop of the motor is lost since the response time of the system is lengthened.

The experiments and simulation studies performed by the Applicant have shown that the above-mentioned instability is due to a jet effect. This effect notably requires that the drive motor of the hydraulic slide valve should develop high power at the opening of this slide valve.

Figure 3:
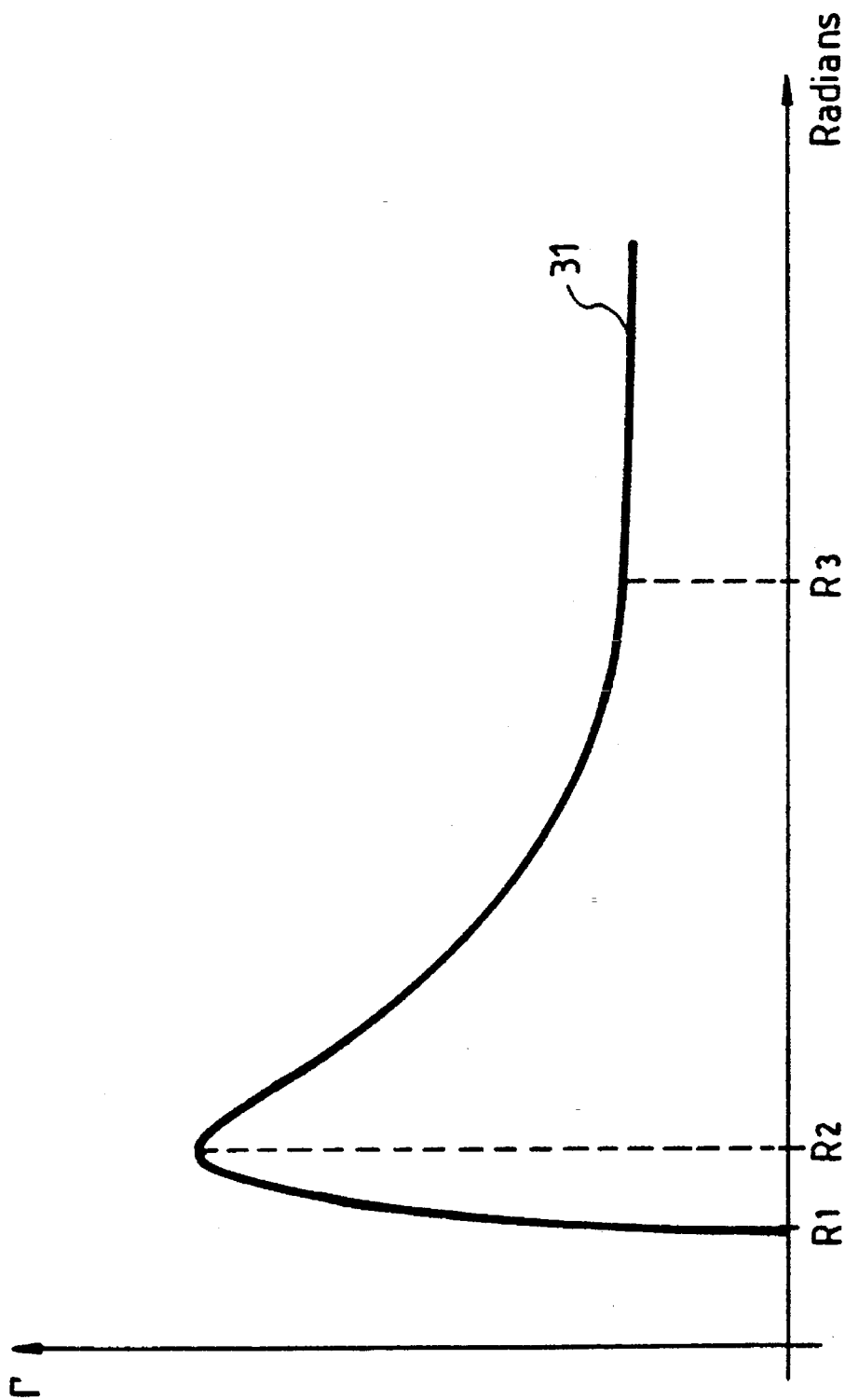
FIGS. 3 and 4 show the action of a jet effect revealed by the Applicant on a system formed by a motor driving a hydraulic slide valve.

In FIG. 3, a curve shows the jet effect revealed by the Applicant. This jet effect is liable to occur when the hydraulic slide valve is opened. This curve 31 represents the antagonistic force which is a resistant torque generated by this effect as a function of the angular position of the motor, the rotary actuator 11 of FIG. 1 for example. The jet effect is illustrated herein on a rotary actuator. However, it would act in the same way on a linear actuator. In the case of FIG. 3, the angular position of the motor is expressed in radians by way of an example.

The curve 31 may be divided into four zones in which the role of this jet effect has been defined by the Applicant:

for an angle $\theta$ such as $0 \leq \theta \leq R_1$, the holes of the slide valve are blocked. There is no flow of oil and the jet effect is zero. The slide valve is then shifted into its idle zone;

for an angle $\theta$ such that $R_1 \leq \theta \leq R_2$, the intake hole is gradually opened and the oil flows into the load. The jet effect increases with the angular position of the motor until its gets stabilized for ($\theta=R_2$). The jet effect is then the maximum. It herein represents the maximum torque that must be produced by the motor to move the slide valve;

for an angle $\theta$ such that $R_2 \leq \theta \leq R_3$, the jet effect decreases when the position increases. If this decrease is excessive, it can be seen that the system becomes uncontrollable;

for an angle $\theta \geq R_3$, the jet effect has disappeared and the force F remains substantially constant.

It is the third zone of decrease of the jet effect that is in fact sensitive because it is in this zone that the Applicant has shown that there is instability.

Figure 4:
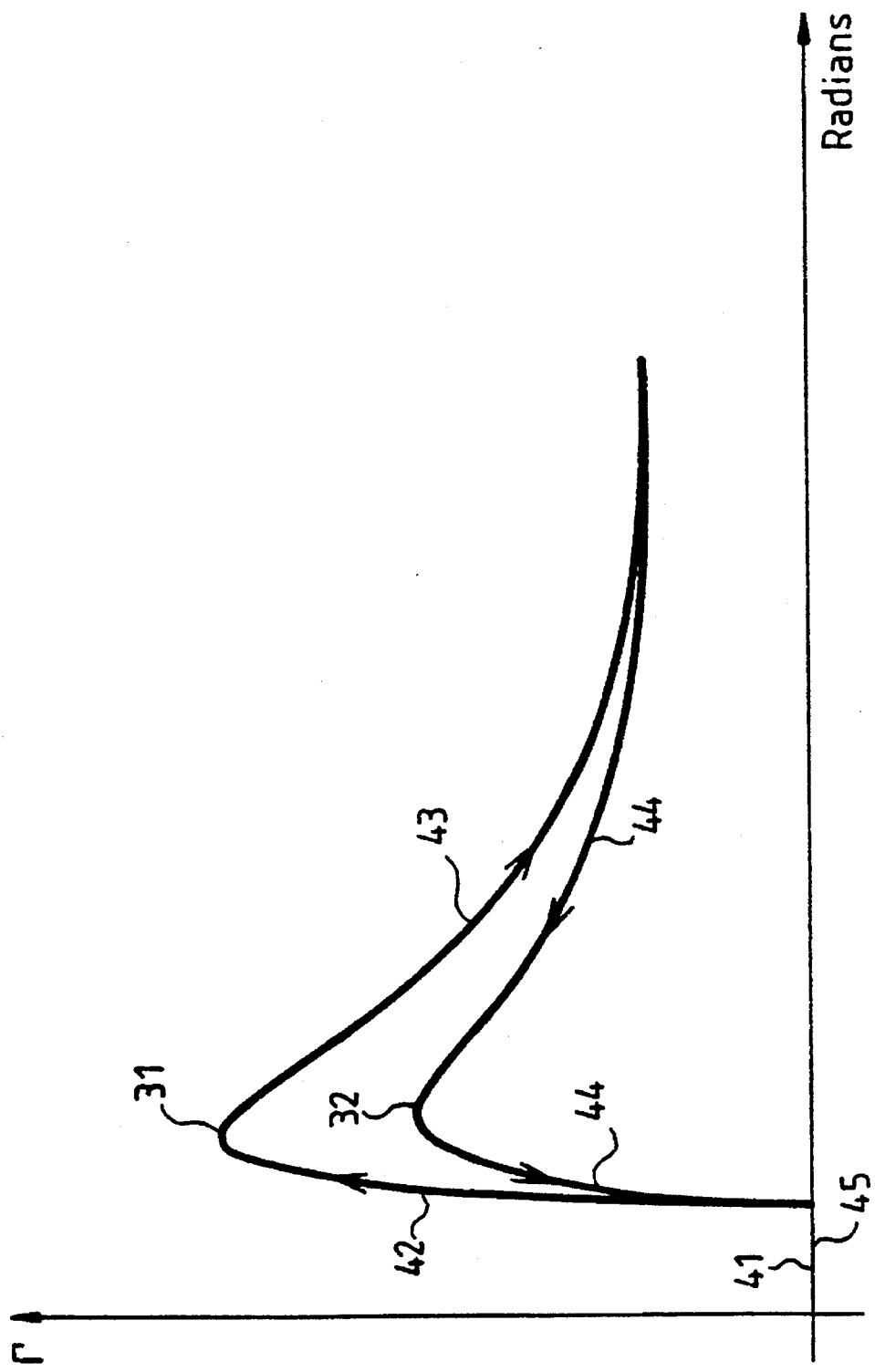

FIG. 4 illustrates an operating cycle of a hydraulic slide valve recorded by the Applicant and subjected to the jet effect. The first curve 31 represents the antagonistic torque generated by the jet effect as a function of the angular position of the motor for a forward shift and a second curve 32 represents this antagonistic force for a return shift.

In a first zone 41 of the cycle, the slide valve moves in its idle zone. There is no flow, hence no jet effect. The positional servo-control is perfectly ensured. The divergence between the instructed value and the output is the minimum.

In a second zone 42, the intake hole is opened gradually. There is a flow rate and hence a jet effect. The positional servo-control is further ensured but the divergence between the instructed value and the outlet gradually grows as and when the instructed value increases. The error produced may be called a trailing error.

In a third zone 43, the slide valve reaches and then goes beyond the point where the action of the jet effect starts weakening. The system goes through a zone of the characteristic of the jet effect that may make the system unstable and even uncontrollable, notably creating oscillations of the hydraulic slide valve. This phenomenon is due to the negative slope of the characteristic.

In a fourth zone 44, the instructed value falls and the system returns to the stable region of the characteristic of the jet effect. The servo-control reacts in the same way as in the second zone 42. When the point of operation goes through this fourth zone 44, the amplitude of the characteristic of the jet effect falls, for the load loss at the slide valve is lower. The flow rate is lower and the jet effect smaller since the latter is generally proportional to the square of the flow rate.

In a fifth zone 45, the intake hole is closed. There is no longer any flow nor any jet effect and the hydraulic slide valve moves in its idle zone. The servo-control system reacts as in the first zone 41.

The jet effect having been characterized, a model is made thereof and then injected into the transfer function of the unit formed by the motor and the hydraulic slide valve, the elements of the servo-control loop being computed as a function of this transfer function.

Figure 5:
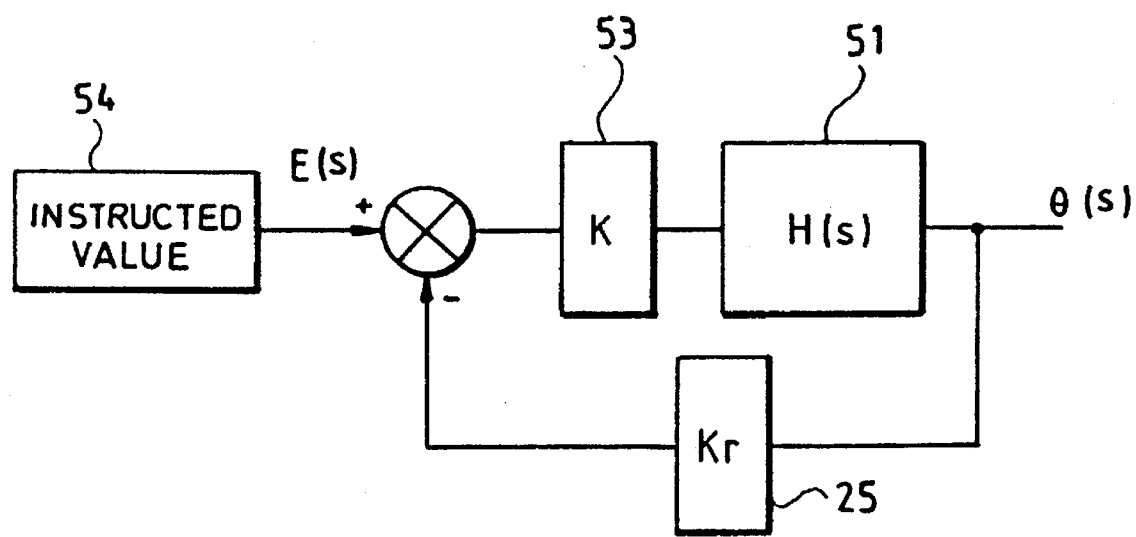
FIG. 5 shows a canonical diagram of the servo-control of the position of the above-mentioned motor.

The servo-control of the position of the motor is illustrated schematically by FIG. 5. The transfer function 51 of the system formed by the motor and the slide valve is represented by a quantity H(s) as a function of the Laplace variable s. The gain of the positional sensor 25 of the motor is represented by a value $K_r$ and that of the correction function 53 by a value K(s) as a function of the Laplace variable. The angle θ(s) of the position of the rotor of the motor is servo-linked to a instructed-value function E(s) 54. θ(s) and E(s) are functions of the Laplace variables.

The transfer function $H_{BF}(s)$ of the looped system is given by the following relationship:

$$H_{BF}(s) = \frac{\theta(s)}{E(s)} = \frac{K(s)\,H(s)}{1 + K_r\,K(s)\,H(s)} \quad (1)$$

The electrical transfer function $H_e(s)$ of the motor is given by the following relationship:

$$H_e(s) = \frac{I(s)}{E(s)} = \frac{1/L}{s + R/L} \quad (2)$$

where I(s) is the current flowing through the stator of the motor, R and L are respectively the series resistance and the inductance of this stator.

The electromechanical transfer function $H_{em}(s)$ of the motor is given by the following relationship:

$$H_{em}(s) = \frac{\Gamma(s)}{I(s)} = g_m \quad (3)$$

the motor torque Γ(s) being proportional to the current I(s) according to a coefficient of proportionality $g_m$.

To define the transfer function of the motor system and of the slide valve, the characteristic of the jet effect is taken into account. This characteristic may be represented in a model as a non-linear relationship linking a stress to a position that is an angular position for the motor. According to the invention, the jet effect is likened to the action of a draw-back spring with a non-linear stiffness $$k_j = \frac{\partial F_j}{\partial x}$$

placed at the end of the slide valve in exerting its draw-back force $F_j$ on this slide valve, $$\frac{\partial F_j}{\partial x}$$

expressing the partial derivative of this force $F_j$ in relation to the position χ of the slide valve. The mechanical transfer function $H_m(s)$ may then be defined by the following relationship:

$$H_m(s) = \frac{\theta(s)}{\Gamma(s)} = \frac{1/J}{s^2 + \frac{B}{J}s + \frac{k_j}{J}} \quad (4)$$

where B represents the coefficient of hydraulic friction of the system constituted by the motor and the 424 slide valve seen by the motor and where J represents the equivalent moment of inertia seen by the motor.

Thus: $B = l^2 R_v$ where $R_v$ is the hydraulic friction of the slide valve and l the length of the linkage arm between the motor and the slide valve and:

$$J = J_m + l^2 M$$

where $J_m$ is the moment of inertia of the rotor and M the mass of the slide valve, l being the above-mentioned length of the linking arm.

$k_j$ represents the gradient of the characteristic of the jet effect according to the above-mentioned model reduced to the motor. Thus, $$k_j = \frac{\partial \Gamma_j}{\partial \theta},$$

being the resistant torque seen by the motor generated by the jet effect and θ being the angle of the rotor. The torque $\Gamma_j$ is actually the antagonistic torque Γ defined in relation to FIGS. 3 and 4, and the partial derivative $$\frac{\partial F_j}{\partial \theta}$$

is deduced from these curves.

Figure 6:
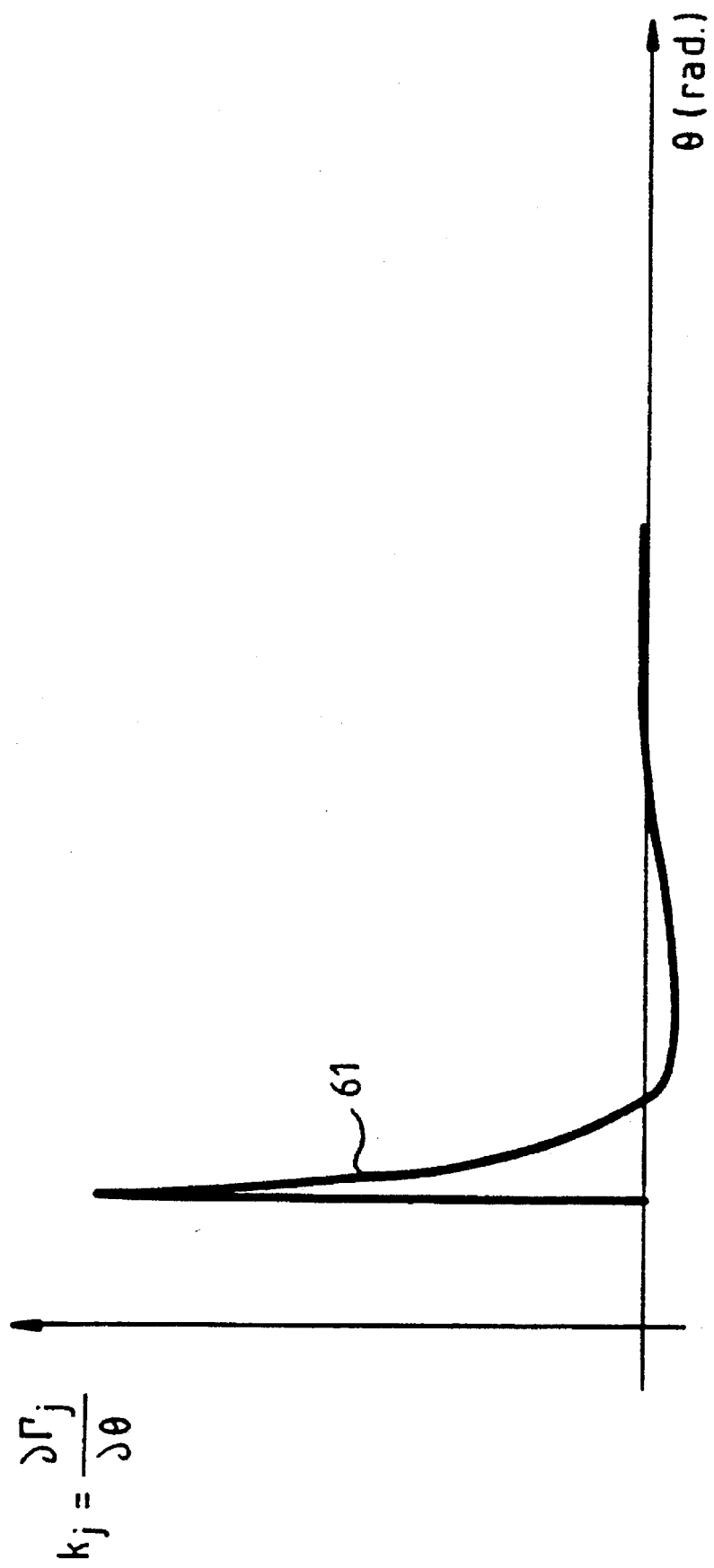
FIG. 6 shows a parameter representing the jet effect taken into account in the transfer function of the function of correcting the position of the motor.

The curve 61 of FIG. 6 illustrates the value of the coefficient $$k_j = \frac{\partial \Gamma_j}{\partial \theta}$$

as a function of the angular position θ, expressed in radians for example of the rotor of the motor. This curve 61 is, for example, deduced from the curve 31 of FIG. 3 as being the derivative of this curve.

The total transfer function H(s) of the system formed by the motor and the hydraulic slide valve is given by the product of the above-mentioned three transfer functions $H_e(s)$, $H_{em}(s)$, $H_m(s)$, that is:

$$H(s) = H_e(s)\,H_{em}(s)\,H_m(s) = \frac{\frac{g_m}{JL}}{\left(s + \frac{R}{L}\right)\left(s^2 + \frac{B}{J}s + \frac{k_j}{J}\right)}$$

It can seen according to this transfer function that the jet effect, by the corresponding term $k_j$, introduces a supplementary order into the transfer function.

With knowledge of the transfer function H(s) of the motor and slide valve system, all that remains to be done, to ensure the stability of the system that is servo-controlled in a loop, is to study the denominator $1+K_xK(s)H(s)$ of the looped transfer function $H_{BF}(s)$ given by the relationship (1) according to the usual knowledge of those skilled in the art and on the basis of the values of the coefficients R, L, J, B and $k_j$ defined hereabove. The transfer function K(s) of the correction function is then determined. Since this function takes account of the jet effect, characterized for example by the parameter $k_j$, the instability due to this effect revealed by the Applicant is then removed. The parameter $k_j$ may, for example, be determined according to a curve as shown in FIG. 6.

Figure 7:
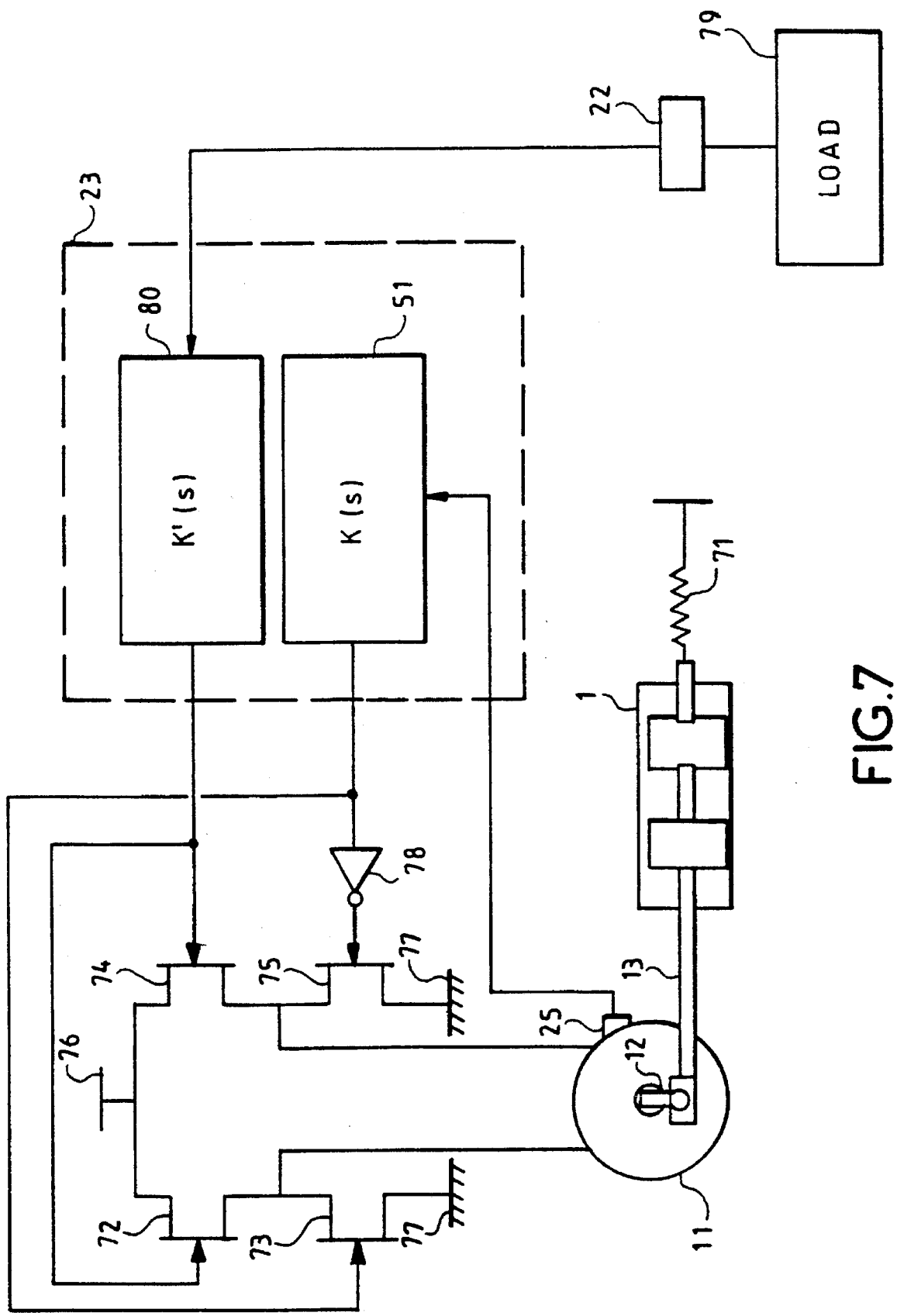
FIG. 7 exemplifies an implementation of the device according to the invention.

FIG. 7 illustrates an exemplary implementation of the device according to the invention.

The hydraulic slide valve 1 controlled by the motor or rotary actuator 11 by means of a link rod 12 and a bar 13 and drawn back by draw-back means 71, for example a spring, is used for example to transmit a control energy to a braking system. The hydraulic inputs and outputs of the slide valve are not shown. Since the jet effect is taken into account in the correction function K(s) and therefore corrected by this function, the instability that it may cause is eliminated and the stiffness of the spring 71 may therefore have a relatively low value. This makes it possible to increase the passband of the system, i.e. to obtain high performance characteristics in terms of response time.

The motor, for example, is current controlled by a bridge of transistors 72, 73, 74, 75 in an H configuration. These are field-effect transistors for example. Transistors 72, 74 of the bridge are connected to a supply 76. The other two transistors 73, 75 are connected to a reference potential 77.

A position sensor 25 is connected to a correction circuit 51 contained, for example, in an electronic module 23 which may be an analog or a digital module. The correction circuit has, for example, the above-defined transfer function K(s). In the case of analog circuits, the computed transfer function K(s) is, for example, obtained by means of an array of capacitors and resistors according to a method known to those skilled in the art. In the case of digital servo-control system, this transfer function is, for example, programmed and then entered into the working memory of a microprocessor. This function has an input signal which is the error signal between a positional instructed value, memorized for example in the electronic module 23, and the position read by the sensor 25. The correction circuit 51 delivers, for example, a binary control signal amplified by circuits (not shown) which controls the direction of rotation of the motor as a function of the error signal, the signal being, for example, controlled in one direction for a positive error signal and in the other direction for a negative error signal. For this purpose, the amplified signal directly activates the gate of one of the two transistors, namely the transistor 73, connected to the reference potential 77 and activates the other transistor 75 connected to this reference potential 77 by means of an inverter 78. If the transistors are bipolar transistors, it is the base that is activated.

A second servo-control loop may, for example, be added to the positional servo-control loop of the motor. This second loop takes account, for example, of the system formed by the motor 11, the slide valve 1 and the load 79 of this valve. In the case of application to a braking system for example, a sensor 22 delivers the pressure level to a second circuit 80 for correcting the transfer function K'(s). This pressure level is compared to an instructed valve memorized, for example, in the electronic module 23. The second correction circuit 80 delivers, for example, a control signal for the other two transistors 72, 74 connected to a supply potential 76. This control signal acting on their gate or their base defines their 1 duration of conduction by periods and hence the value of the mean current delivered to the motor. This in fact determines the force exerted by the slide valve on the load 79 which is a braking system for example. The hydraulic slide valve may be a one-stage or multiple-stage slide valve.

What is claimed is:

1. A device for the control of a hydraulic slide valve, the hydraulic slide valve being put into motion by a motor and a draw-back spring, wherein said device comprises means to control the direction of rotation of the motor as a function of positional error of said motor, the means to control the direction of rotation being controlled by a signal given by a correction circuit providing a transfer function (K(s)) proportional to a jet effect acting on the slide valve, the jet effect simulating the action of a draw-back spring with non-linear stiffness.

2. A device according to claim 1, wherein the signal given by the correction circuit is a binary signal.

3. A device according to claim 1, wherein the jet effect is characterized by a coefficient ($k_j$) equal to the partial derivative $$\left(\frac{\partial \Gamma_j}{\partial \theta}\right)$$

of an antagonistic torque ($\Gamma_j$) that it produces with respect to an angular portion ($\theta$) of a rotor of the motor.

4. A device according to claim 3, wherein a transfer function H(s) used for a unit constituted by the motor and the hydraulic slide valve has the following form:

$$H(s) = \frac{\frac{g_m}{JL}}{\left(s+\frac{R}{L}\right)\left(s^2+\frac{B}{J}s+\frac{k_j}{J}\right)}$$

where:

$g_m$ is a coefficient of proportionality between the torque developed by the motor and the current flowing through it;

J is the equivalent moment of inertia of the unit;

R is the series resistance of a stator the motor;

L is the inductance of the motor;

B is the coefficient of hydraulic friction of the unit;

$k_j$ is the characteristic of the jet effect, the transfer function K(s) of the correction circuit being computed so that the looped servo-control of the position of the unit is stable.

5. A device according to claim 2, wherein the means for controlling the rotational direction of the motor are constituted by two transistors of a bridge of transistors in an H configuration supplying the motor and an inverter, the binary signal directly activating one of said two transistors and activating the one of said two transistors by means of the inverter, the two transistors being connected to a same potential.

6. A device according to claim 2, wherein the positional error is the error between an instructed value stored in an electronic module and the position of a rotor of the motor read by a sensor connected to the electronic module, the error signal being given to the correction circuit, the output binary signal of said circuit being amplified.

7. A device according to claim 6, wherein the transfer function (K(s)) of the correction circuit is programmed and stored in the working memory of a microprocessor contained in the electronic module.

8. A device according to claim 1, wherein a second servo-control loop is adjoined to a loop for the positional servo-control of the motor, the second servo-control loop controlling the value of the mean current flowing through the motor as a function of a level of load of this slide valve.

9. A device according to claim 8 wherein, with the hydraulic slide value being provided to a braking system, the second loop servo-controls the value of the current of the motor as a function of the level of pressure in the braking system.

* * * * *